United States Patent
Huang et al.

(10) Patent No.: US 6,416,881 B1
(45) Date of Patent: *Jul. 9, 2002

(54) MEDIA WITH A METAL OXIDE SEALING LAYER

(75) Inventors: Lin Huang; Liji Huang, both of San Jose; Qixu David Chen, Milpitas; Charles Leu, Fremont; Rajiv Yadav Ranjan, San Jose, all of CA (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/571,506

(22) Filed: May 15, 2000

Related U.S. Application Data (60) Provisional application No. 60/148,329, filed on Aug. 10, 1999.

(51) Int. Cl.$^7$ ................................................ G11B 5/64
(52) U.S. Cl. ....................... 428/611; 428/640; 428/666; 428/332; 428/694 TS; 428/701; 428/900; 204/192.2
(58) Field of Search ....................... 204/192.2; 428/611, 428/900, 660, 668, 212, 332, 694 TS, 701, 702, 640, 666, 694 MM (56) References Cited

U.S. PATENT DOCUMENTS

| | | |
|---|---|---|
| 4,624,892 A | 11/1986 | Ishizaki et al. |
| 4,651,172 A | 3/1987 | Watanabe et al. |
| 4,842,917 A | 6/1989 | Ohno et al. |
| 4,900,622 A | 2/1990 | Nakayama et al. |
| 5,029,317 A | 7/1991 | Kawai et al. |
| 5,084,152 A | 1/1992 | Lin |
| 5,118,564 A | 6/1992 | Shinohara et al. |
| 5,456,978 A | 10/1995 | Lal et al. |
| 5,665,478 A | 9/1997 | Suzuki et al. |
| 5,721,033 A * | 2/1998 | Teng et al. ................. 428/65.3 |
| 5,800,931 A | 9/1998 | Lee et al. |
| 5,820,963 A | 10/1998 | Lu et al. |
| 5,853,847 A | 12/1998 | Takahashi |
| 5,910,344 A | 6/1999 | Hasegawa et al. |
| 5,923,504 A | 7/1999 | Araki et al. |
| 5,969,080 A | 10/1999 | Ieki et al. |
| 5,998,340 A | 12/1999 | Furutani et al. |
| 6,146,737 A * | 11/2000 | Malhotra et al. .......... 428/65.3 |
| 6,174,582 B1 * | 1/2001 | Bian et al. ................. 428/65.3 |

OTHER PUBLICATIONS

McIntire, G., and Brucker, C., IEEE Trans. Mag., 24(5), 1988, 2221–2225.*
Yanagisawa, M., Yamamoto, T., Shiota, N., Tsukamoto, Y., and Goto, F., IEEE Trans. Mag., 25(5), 1989, 3734–3736.*

* cited by examiner

Primary Examiner—Stevan A. Resan
Assistant Examiner—Kevin M. Bernatz
(74) Attorney, Agent, or Firm—Morrisson & Foerster LLP (57) ABSTRACT

Sputter-deposited amorphous metal oxide films on substrates comprising an aluminum-containing support and a Ni-containing pre-coat reduce Ni ion migration significantly from the substrate onto the top surface of the magnetic recording media. Longitudinal magnetic recording media deposited on metal oxide sealing layers have very good magnetic recording performances and are suitable for high density recording application.

11 Claims, 7 Drawing Sheets

Fig. 1: A conventional longitudinal recording disk medium (prior art).

Fig. 2: A longitudinal or perpendicular recording disk medium in accordance with an embodiment of the present invention.

| Chamber # | 1 | 2 | 3 | 4 | 5 | 6 | 7 | 8 | 9 | 10 | 11-15 | 16 | 17-19 | 20 |
|---|---|---|---|---|---|---|---|---|---|---|---|---|---|---|
| Function | Load luck | Soak Heater | Buffer chamber | Cr barrier layer | Oxidation | Buffer chamber | Buffer chamber | Seedlayer / Underlayer / Intermediate layer | Buffer chamber | Magnetic layer | Buffer chambers | Carbon overcoat | Buffer chambers | Unload luck |

Fig. 3: Process configuration of in-line sputtering machine.

Fig. 4: CrOx thickness effect on Ni and Co migration onto the top surface of the magnetic recording medium.

Fig. 5: CrOx thickness effect on $H_{cr}$ and S*

Fig. 6: CrOx thickness effect on SMNR, PW$_{50}$ and OW

Figure 7. (a) Comparison of surface Co/Ni concentration for the disks with carbon overcoat thickness (30 and 120Å, respectively) stressed at 60°C/80% relative humidity for 96 hours; (b) Ni ion mapping, from the same disk with 30 Å carbon overcoat by TOF-SIMS.

US 6,416,881 B1

MEDIA WITH A METAL OXIDE SEALING LAYER

RELATED APPLICATIONS

This application claims priority from provisional No. 60/148,329 filed Aug. 10, 1999, entitled "CrOx barrier layer for the Ni corrosion of longitudinal recording media," the entire disclosure of which is hereby incorporated herein by reference.

TECHNICAL FIELD

This invention relates to a magnetic medium, such as a thin film magnetic recording medium, and the method of manufacturing the medium. The invention has particular applicability to high density magnetic recording media having a total film thickness above a substrate of about 1000 Å or less while still exhibiting low noise, improved flying stability, glide performance and head-media interface reliability.

BACKGROUND ART

Magnetic disks and disk drives are conventionally employed for storing data in magnetizable form. Typically, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk.

Data are written onto and read from a rapidly rotating recording disk by means of a magnetic head transducer assembly that flies closely over the surface of the disk. It is considered desirable during reading and recording operations to maintain each transducer head as close to its associated recording surface as possible, i.e., to minimize the flying height of the head. This objective becomes particularly significant as the areal recording density increases. The areal density (Mbits/in$^2$) is the recording density per unit area and is equal to the track density (TPI) in terms of tracks per inch times the linear density (BPI) in terms of bits per inch.

The increasing demands for higher areal recording density impose increasingly greater demands on flying the head lower because the output voltage of a disk drive (or the readback signal of a reader head in disk drive) is proportional to 1/exp(HMS), where HMS is the space between the head and the media. Therefore, a smooth recording surface is preferred, as well as a smooth opposing surface of the associated transducer head, thereby permitting the head and the disk to be positioned in closer proximity with an attendant increase in predictability and consistent behavior of the air bearing supporting the head.

A substrate material conventionally employed in producing magnetic recording rigid disks comprises an aluminum-magnesium (Al—Mg) alloy. Such Al—Mg alloys are typically electrolessly plated with a pre-coat layer of NiP at a thickness of about 15 microns to increase the hardness of the substrates, thereby providing a suitable surface for polishing to provide the requisite surface roughness or texture.

Other substrate materials have been employed, such as aluminum, glass, e.g., an amorphous glass, glass-ceramic material which comprise a mixture of amorphous and crystalline materials, and ceramic materials. Glass-ceramic materials do not normally exhibit a crystalline surface. Glasses and glass-ceramics generally exhibit high resistance to shocks. The use of glass-based materials, such as glass-ceramic materials, is disclosed by Hoover et al., U.S. Pat. No. 5,273,834, which is incorporated herein by reference.

Figure 1:
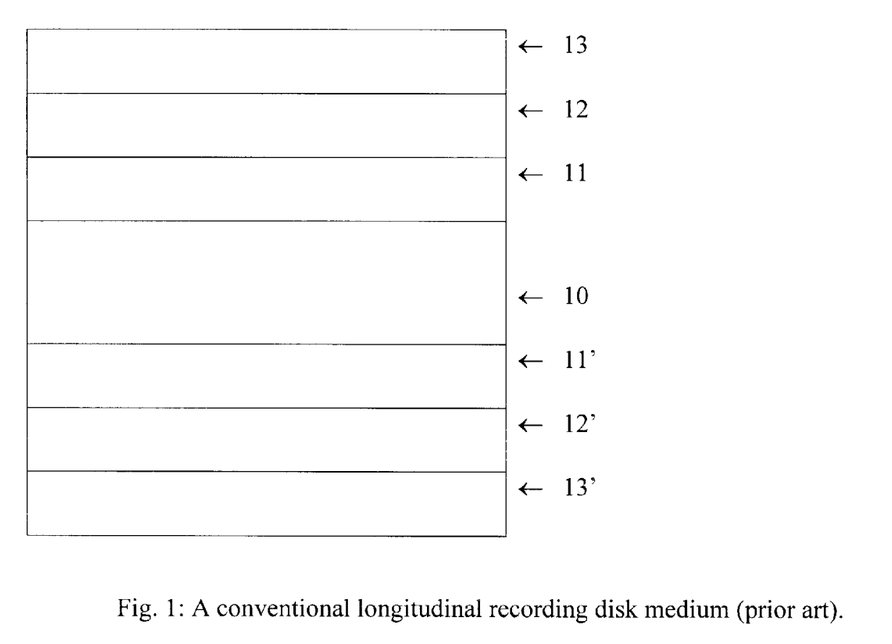
FIG. 1 schematically shows a conventional magnetic recording medium structure.

A conventional longitudinal recording disk medium is depicted in FIG. 1. It typically comprises a substrate 10, comprising an aluminum platter with a 10–15 microns thick NiP pre-coat layer, and sequentially deposited on each side of the substrate are an underlayer 11, 11', such as chromium (Cr) or Cr-alloy, a magnetic layer 12, 12', typically comprising a cobalt (Co)-base alloy, and a protective overcoat 13, 13', typically containing carbon. Conventional practices also comprise bonding a lubricant topcoat (not shown) to the protective overcoat. Underlayer 11, 11', magnetic layer 12, 12', and protective overcoat 13, 13', are typically deposited by sputtering techniques. The Co-base alloy magnetic layer deposited by conventional techniques normally comprises polycrystallites epitaxially grown on the polycrystal Cr or Cr-alloy underlayer. A conventional perpendicular recording disk medium is similar to the longitudinal recording medium depicted in FIG. 1, but does not comprise Cr-containing underlayers.

Conventional methods for manufacturing longitudinal magnetic recording medium comprise applying a seed layer between the substrate and underlayer. A seed layer seeds the nucleation of a particular crystallographic texture of the underlayer.

Longitudinal magnetic recording media with substrates having an Al, Al—Mg, glass or glass-ceramic support are commercially available from different manufacturers with a pre-coat layer of materials that influence the crystallographic orientation of subsequently deposited seed layer and/or underlayer and magnetic layers. Pre-coat on the support of the substrate also facilitates laser texturing and mechanical texturing process. Such conventional pre-coat layer materials include nickel-phosphorous (Ni—P) which is typically sputter deposited on the surface of the bare substrate.

Conventional longitudinal magnetic recording media comprising a substrate having NiP sputtered thereon also comprise, sequentially deposited thereon, a Cr or Cr-alloy seed layer and/or underlayer at an appropriate thickness, e.g., about 750 Å, a magnetic layer such as Co—Cr-platinum (Pt)-tantalum (Ta) at an appropriate thickness, e.g., 250 Å, and a protective carbon overcoat at an appropriate thickness, e.g., about 75 Å. Conventional Cr-alloy seed layer and/or underlayer comprise vanadium (V), titanium (Ti), tungsten (W) or molybdenum (Mo). Other conventional magnetic layers are CoCrTa, CoCrPtB, CoCrPt, CoCrPtTaNb and CoNiCr. The seed layer, underlayer, and magnetic layer are conventionally sequentially sputter deposited on the glass or glass-ceramic substrate in an inert gas environment, such as an environment of pure argon. A conventional carbon overcoat is typically deposited in argon with nitrogen, hydrogen or ethylene plasma. Conventional lubricant topcoats are typically about 20 Å thick. In short, in conventional recording media the thickness of all of the layers deposited on the substrate having a NiP pre-coat layer is typically more than 1000 Å. When the thickness of all the layers above the NiP pre-coat layer is about 1000 Å or more, migration of Ni to the top surface of the recording was not recognized to be a problem.

SUMMARY OF THE INVENTION

However it has been observed that Ni ion migration onto the top surface of the recording media becomes more severe as the total film thickness of the media decreases. Ni atoms can diffuse to the top of overcoat and form micro-crystal clusters, which make recording head more vulnerable and cause disk drive failure. Applicants found that Ni from the NiP layer leaches from the substrate to the top surface of the medium while also promoting leaching of Co from the magnetic layer to the top surface of the medium when the thickness of all layers on top of the NiP pre-coat layer is 1000 Å or less, particularly about 500 Å or less. Applicants also found that corrosion products on the top surface are picked up by a low-flying recording head of a high density medium causing smearing on the recording head and disc surface, resulting in increased stiction and eventual drive failure. Therefore, applicants recognized that there is a need to find sealing layers, which enhance magnetic recording performances, reduce Ni migration, and have good adhesion to the substrates. This invention provides a method to prevent Ni migration onto the top surface of the media during the manufacturing process and the life of the recording media.

The present invention is a magnetic recording medium comprising a substrate containing Ni that does not significantly migrate to the surface of the recording medium. In one embodiment, the substrate comprises a support and a Ni-containing pre-coat layer on the support.

Another advantage of the present invention is a method of manufacturing a magnetic recording medium comprising a substrate containing Ni that does not significantly migrate to the surface of the medium.

Additional advantages and other features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by a magnetic recording medium comprising longitudinal or perpendicular magnetic recording medium comprising a substrate comprising Ni, a sealing layer comprising metal oxide, and a magnetic layer, wherein the sealing layer substantially prevents the migration of Ni from the substrate.

Another embodiment of this invention is a longitudinal or perpendicular magnetic recording medium comprising a substrate comprising Ni, a sealing means for substantially preventing the migration of Ni from the substrate, and a magnetic layer. Embodiments of the sealing means include a sputter deposited layer of a sealing material such as metal oxide, preferably amorphous metal oxide, most preferably amorphous CrOx, that substantially prevents the migration of Ni from the substrate in which the support may be an Al-containing support, e.g., Al or Al—Mg, or made of glass or glass-ceramic materials. In this invention, CrOx refers to an oxide of Cr. Similarly, TiOx, MoOx, WOx, TaOx, ZrOx and NbOx refer to an oxide of Ti, an oxide of Mo, an oxide of W, an oxide of Ta, an oxide of Zr and an oxide of Nb, respectively.

The sealing layer or the sealing means can substantially prevent the migration of Ni from the substrate by limiting nickel ions migrating onto a top surface of the medium to an intensity of $10^{12}$ atoms/cm$^2$ or less during the lifetime of the recording medium when the thickness of the layers above the substrate starting from the sealing layer is 1000 Å or less. In a preferred embodiment, the thickness of the layers above the substrate starting from the sealing layer is 750 Å or less. In a more preferred embodiment, the thickness of the layers above the substrate starting from the sealing layer is 500 Å or less.

Another aspect of the present invention is a method comprising sputter depositing sealing layer comprising metal oxide, preferably amorphous CrOx, on substrate comprising Ni and sputter depositing a magnetic layer on the sealing layer, wherein the sealing layer substantially prevents migration of Ni from the substrate.

Embodiments include sputter depositing a Cr layer on a nickel-containing layer and then oxidizing the Cr layer by exposure to argon and oxygen premixed gas to form the CrOx sealing layer, which optionally comprises boron (B), tungsten (W), tantalum (Ta), Zirconium (Zr), Niobium (Nb) and phosphorus (P).

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the present invention. The drawings and description are to be regarded as illustrative in nature, and not as restrictive.

BRIEF DESCRIPTION OF DRAWINGS

FIG. 7.(a) Comparison of surface Co/Ni concentration for the disks with carbon overcoat thickness (30 and 120 Å, respectively) stressed at 60° C./80% relative humidity for 96 hours; (b) Ni ion mapping, from the same disk with 30 Å carbon overcoat by TOF-SIMS.

DESCRIPTION OF THE INVENTION

The present invention enables the manufacture of magnetic recording media exhibiting low Ni migration and suitable for high density longitudinal and perpendicular magnetic recording employing substrates having a pre-coat layer having high Ni concentrations, e.g., about 10 to about 90 at. %, preferably about 50 to about 90 at. %, most preferably about 70 to 90 at. %. As a result, the utility of such a recording medium is expanded to extreme environments, including high temperature humidity environments, using a very small gap between the head and medium. This objective is achieved in accordance with embodiments of the present invention by strategically forming a sealing layer or a sealing means on the Ni-containing pre-coat layer on the substrate. The sealing layer or the sealing means substantially prevents the migration of Ni from the Ni-containing pre-coat layer on the substrate.

The sealing layer can function as a seed layer when the layer affects the magnetic properties of the media. A sealing layer is a layer that can reduce Ni concentration on the surface of the magnetic media to less than $10^{12}$ atoms/cm$^2$ by the time-of-flight secondary ion mass spectrometry (TOF-SIMS) method as follows. After the disc media are sputter-deposited, about 20 Å of lubricant was applied onto the surfaces of the discs. The discs were sent into a chamber in the environment of 80° C. and 80% relative humidity (RH) for 4 days, then were analyzed with TOF-SIMS. The surface concentrations of Ni and Co are used as disc corrosion criteria and is expressed in $\mu$g/disc or counts/minute.

The exact mechanism underpinning sealing of Ni to the substrate employing a metal oxide layer, preferably amorphous metal oxide, is not known with certainty. It is believed that Ni migration is substantially prevented by denying Ni ions access to grain boundaries, which are high diffusion paths. An amorphous layer and a single-crystal type layer are substantially devoid of grain boundaries and, hence, could provide effective sealing of Ni from the substrate. While an amorphous metal oxide layer is the preferred embodiment, any metal oxide layer that could substantially prevent the migration of Ni from the substrate could be employed in this invention.

Embodiments of the substrate comprising Ni includes Al, Al—Mg, glass or glass-ceramic support with a pre-coat of NiP, NiNb or other Ni-containing material. Embodiments of the sealing layer and the sealing means include sputter deposited CrOx, preferably amorphous CrOx, layer on the pre-coat of the substrate. The sputter deposited CrOx layer prevents Ni migration from the substrate. Optionally, the sealing layer can contain one or more elements or the oxides of elements such as Ti, Mo, W, Ta, Zr and Nb. The preferred ranges of Ti, Mo, Cr, Nb, W, Ta, Zr and Nb, etc. are as follows. Cr: 12 to 72 at. %, preferably, 37 to 62 at. %, more preferably, 51 to 62 at. %; and for one or more combinations of elements from Ti, Mo, B, W, Ta, Zr, Nb and P the preferred range is 0.1 to 5 at. %; the balance is Cr and oxygen. In other embodiments, the sealing layer material is selected from the group consisting of TiOx, MoOx, WOx, TaOx, ZrOx and NbOx.

The sealing layer or layers can advantageously be deposited at a total thickness of about 100 Å to about 1000 Å, such as about 200 Å to about 600 Å, preferably about 400 Å to about 450 Å. The sealing layer can be a sputter deposited metal layer, e.g., a Cr layer, which is oxidizing by exposure to oxygen to metal oxide. The sealing layer is formed by producing a metal oxide layer on a surface of a freshly deposited metal layer, such as a Cr layer. Preferably, one third of the metal layer is oxidized to metal oxide. More preferably, two third of the metal layer is oxidized to metal oxide.

Embodiments of the present invention also comprise forming an adhesion enhancement layer, such as Cr or Cr alloy, between the sealing layer and substrate for improved adhesion of the sealing layer to the underlying substrate without reducing the sealing effect of the sealing layer.

Embodiments of the present invention also comprise depositing a seed layer or/and underlayer on the sealing layer, such as a Cr or Cr alloy, e.g., chromium vanadium (CrV), depositing a magnetic layer on the seed layer or/and underlayer, such as a Co alloy, e.g., an alloy of Co, Cr, platinum and tantalum (CoCrPtTa), and a carbon-containing overcoat thereon, such as hydrogenated carbon. As in conventional practices, a lubricant topcoat can be applied on the carbon-containing overcoat.

Advantageously, the present invention enables the manufacture of magnetic recording media on substrate with a large amount of Ni and enables the use of such magnetic recording medium for very high-density recording using very small gap between the head and the medium.

This objective is achieved in accordance with various embodiments of the present invention by depositing an adhesion enhancement layer between the substrate and the sealing layer, e.g., by depositing an adhesion enhancement layer directly on the substrate and depositing a sealing layer directly on the adhesion enhancement layer.

An adhesion enhancement layer is a sputter-deposited thin film layer in the thickness range of 15 Å to 200 Å that provides a better adhesion between the substrate, which is below the adhesion layer, and a layer above the adhesion layer than without the presence of the adhesion layer. More force is needed to peel-off the magnetic media with adhesion enhancement layer than the force to peel-off otherwise identically deposited magnetic media, but without the said adhesion enhancement layer. In a preferred embodiment, the adhesion enhancement layer is a sputter-deposited thin film layer in the thickness range of 25 Å to 75 Å.

Figure 2:
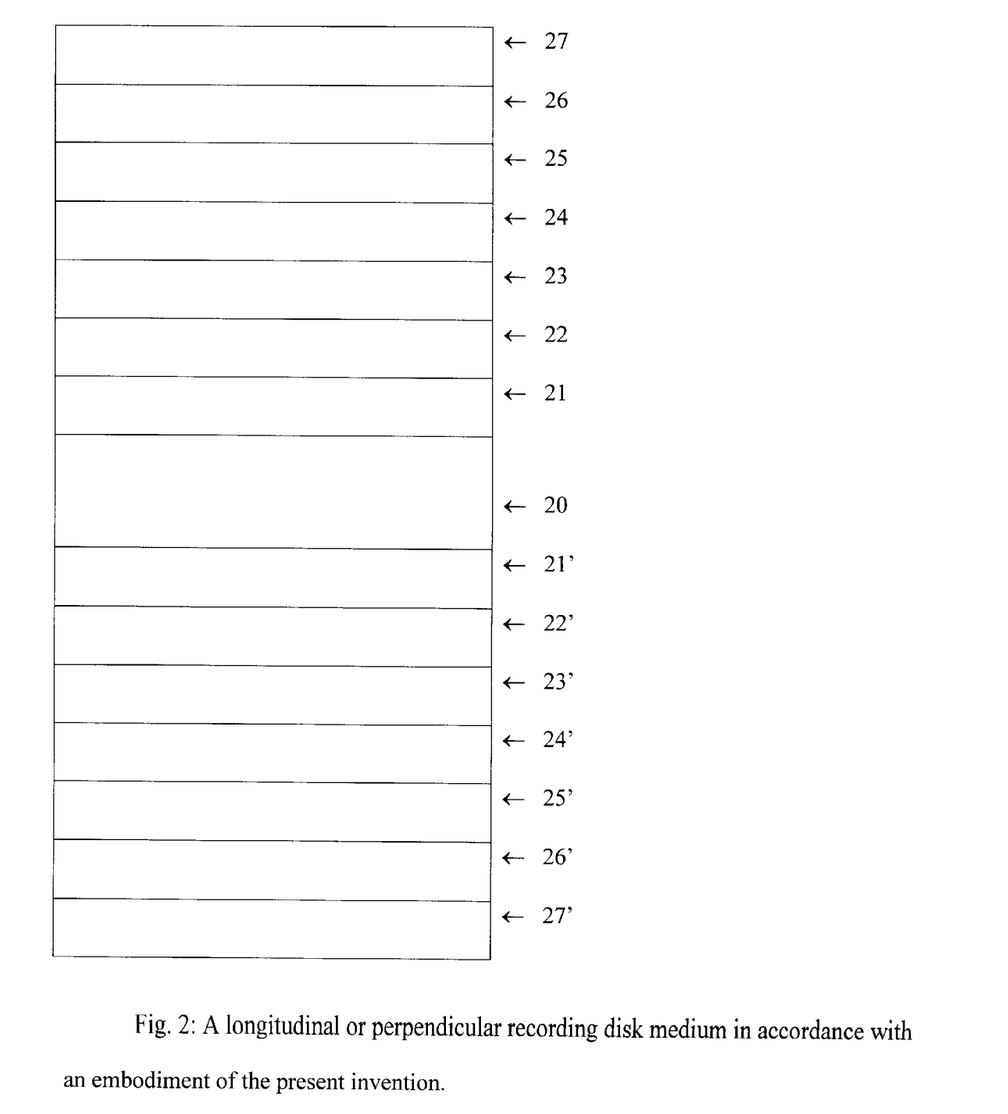
FIG. 2 schematically shows a magnetic recording medium structure in accordance with an embodiment of the present invention.

An embodiment of the present invention is schematically illustrated in FIG. 2 and comprises a substrate 20 having a pre-coat of a Ni-containing material. Sequentially deposited on each side of substrate 20 are CrOx sealing layer 21, 21', seed layer 22, 22', underlayer 23, 23', intermediate layer 24, 24', magnetic layer 25, 25', carbon protective overcoat 26, 26' and lubricant 27, 27'.

CrOx sealing layer 21, at a thickness of about 20 to 800 Å, preferably about 200 to 600 Å, is most preferably about 400 Å thick. Seed layer 22, at a thickness of about 20 to 800 Å, preferably about 25 to 200 Å, most preferably about 130 Å, can comprise Cr or Cr alloy. Underlayer 23, at a thickness of about 10 to 500 Å, preferably about 15 to 200 Å, most preferably about 20 Å, can comprise Cr or an alloy thereof, such as CrV. Suitable intermediate layer 24 includes CrW, CoCr or Cr alloy at a thickness of 10 to 500 Å, preferably about 50 to 200 Å, most preferably about 150Å. Suitable magnetic layer 25 includes a Co-containing layer, such as a CoCrPtTa alloy at a thickness of about 25 to 500 Å, preferably about 50 to 250 Å, most preferably about 150Å. Suitable materials for protective overcoat 26, at a thickness of about 25 to 125 Å, preferably about 30 to 75 Å, most preferably about 50 Å include a hydrogenated carbonated film. A Cr or Cr alloy adhesion enhancement layer can optionally be deposited between a Ni-containing precoat layer and the substrate at a thickness of about 100 to 1000 Å, preferably about 200 to 600 Å, most preferably about 150 Å to improve the adhesion of the Ni-containing layer without affecting the crystallographic orientation of the underlayer and the magnetic layer.

Figure 3:
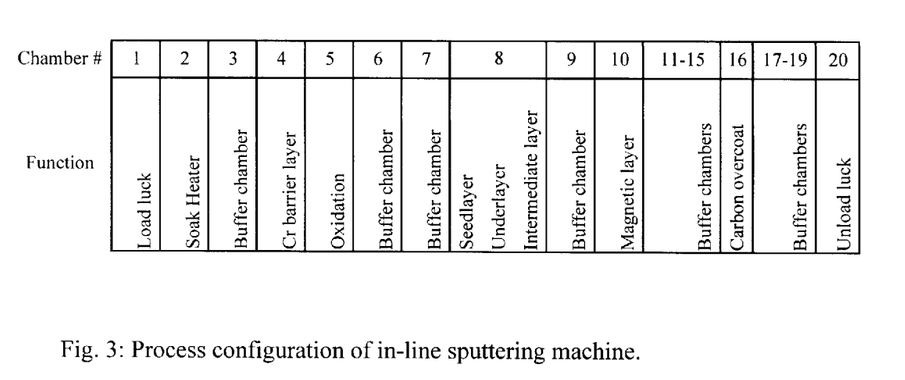
FIG. 3 is a process configuration of in-line sputtering machine.

Advantageously, the present invention can be conducted by sputter depositing layers shown in the embodiment of FIG. 3 in an in-line pass-by apparatus comprising a plurality of sequentially spaced sputtering chambers.

EXAMPLES

1) Film Configuration

The film configuration of an embodiment of the present invention is shown in FIG. 2. The structure of the media was that of FIG. 2 and thickness of the layers of the media were as follows: a CrOx sealing layer of 400 Å; a CrW seed layer of 150 Å; a CoCr underlayer of 150 Å; a CoCrTaPt intermediate layer of 75 Å; a CoCrTaPt magnetic layer of 100 Å; a carbon layer of 75 Å; and a lubricant layer of 20 Å. On the substrate (which can be NiP coated Al, NiP coated glass, or alternative substrates), a Cr layer is deposited by DC magnetron sputtering then oxidized by $Ar+O_2$ premixed gas.

CrOx was formed during oxidation and passivation of the Cr surface. Following the CrOx formation process, a seed layer and/or an underlayer, an intermediate layer and a magnetic layer are deposited by DC magnetron sputtering. Then AC or RF sputtering is used for depositing a carbon overcoat. This invention applies to any manufacturing process for longitudinal recording media.

2) Sputtering Machine and Process

A schematic drawing of the in-line sputtering machine used to deposit the invented disks is shown in FIG. 3. All chambers have a vacuum at about $10^{-6}$ Torr.

A pallet, which carry multiple disks, enters the load chamber 1, then is heated in chamber 2. After that, the pallet is transferred to chamber 4 to deposit the Cr layer. The pallet then is transferred to chamber 5. A fresh deposited Cr layer is oxidized by introducing a gaseous mixture of Ar+20% $O_2$. The disks are heated again in chamber 6. A seed layer, an underlayer and an intermediate layer are deposited in chamber 8. Then a magnetic layer is deposited in chamber 10. A carbon overcoat is finally deposited on the magnetic layer in chamber 16.

3) Evidence that $CrO_x$ Serves as a Barrier Layer for Ni Migration

Ni migration results in the formation of Ni corrosion on the top surface of the recording media. The structure of the media was that of FIG. 2 and thickness of the layers of the media were as follows: a CrOx sealing layer of 400 Å; a CrW seed layer of 200 Å; a CoCr underlayer of 150 Å; a CoCrTaPt intermediate layer of 120 Å; a CoCrTaPt magnetic layer of 120 Å; a carbon layer of 75 Å; and a lubricant layer of 20 Å.

Figure 4:
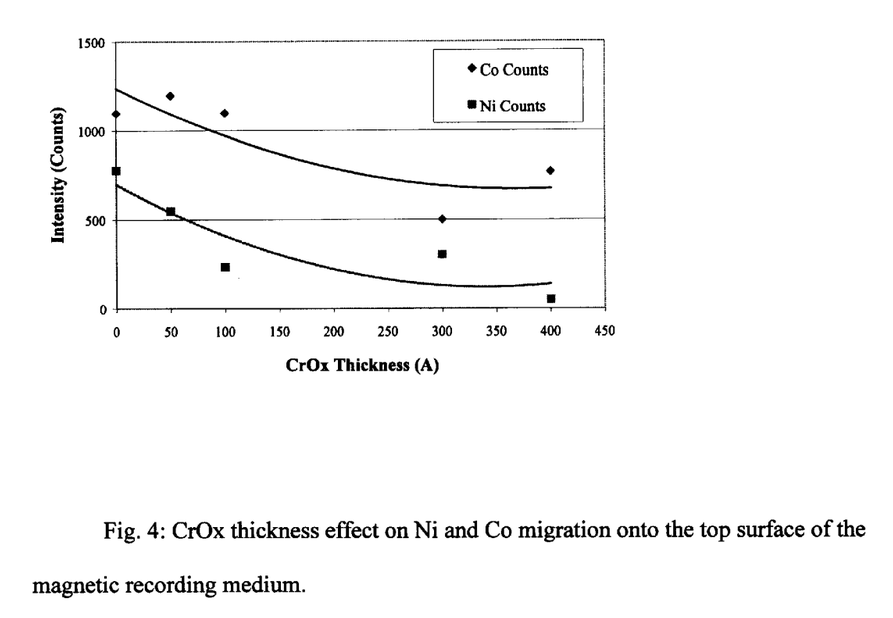
FIG. 4 CrOx thickness effect on Ni and Co migration onto the top surface of the magnetic recording medium.

Ni migration test was performed in environmental chamber at 80° C. and 80% relative humidity for 4 days by measuring the amount of corroded Ni present on the top surface of the media. TOF-SIMS is the tool monitoring Co and Ni species on the top surface. FIG. 4 demonstrates that 400 Å CrOx can reduce Ni corrosion by 15 times and Co corrosion is reduced by 1.4 times as well. The data were collected with PHI Trift I time-of-flight secondary ion mass spectrometry (TOF-SIMS) system with a 15 KeV pulsed Ga liquid metal ion gun. The Co peak at 58.93 amu from the TOF-SIMS spectra was integrated and normalized to the spectrum acquiring time (per minute). Three data points were acquired from each sample and the data shown in the figure is the average. The detection limit is about 10 counts/min. The standard deviation is about 10% for each data point.

Figure 5:
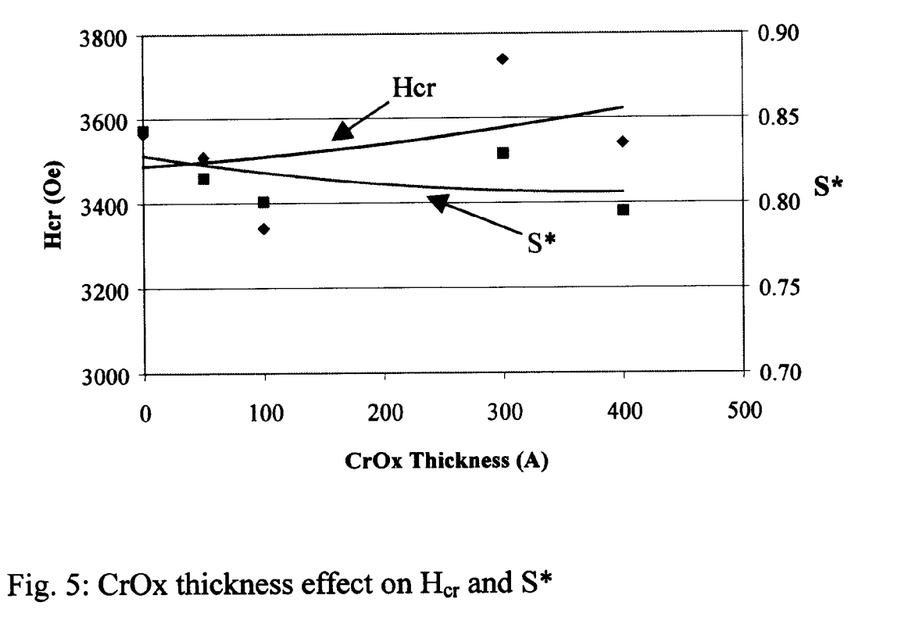
FIG. 5 shows CrOx thickness effect on $H_{cr}$ and S*.
Figure 6:
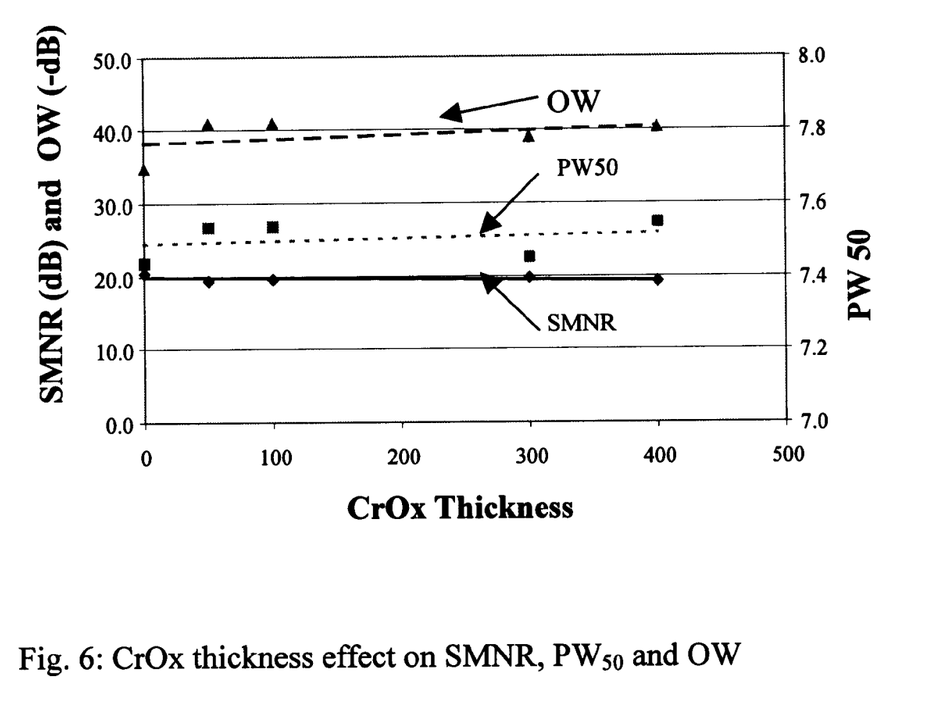
FIG. 6 shows CrOx thickness effect on SMNR, $PW_{50}$ and OW.

CrOx thickness effects on remanent coercivity ($H_{cr}$), remanent coercivity squareness (S*), signal to medium noise ratio (SMNR), pulse width at half height ($PW_{50}$) and overwrite (OW) are plotted in FIGS. 5 and 6. The structure of the media was that of FIG. 2 and thickness of the layers of the media were as follows: a CrOx sealing layer of a thickness shown in these figures; a CrW seed layer of 200 Å; a CoCr underlayer of 150 Å; a CoCrTaPt intermediate layer of 120 Å; a CoCrTaPt magnetic layer of 120 Å; a carbon layer of 75 Å; and a lubricant layer of 20 Å. No significant impacts are observed except 5 dB increase in overwrite capability. $H_{cr}$ and S* were measured with Rotating Disc Magnetometer (RDM). SMNR, OW, and $PW_{50}$ were measured with a read-write analyzer from Guzik Technical Enterprise, San Jose, Calif. A giant magnetoresistive (GMR) head was used for the test. SMNR was measured at 360 kfci (thousand flux reversal per inch).

Figure 7:
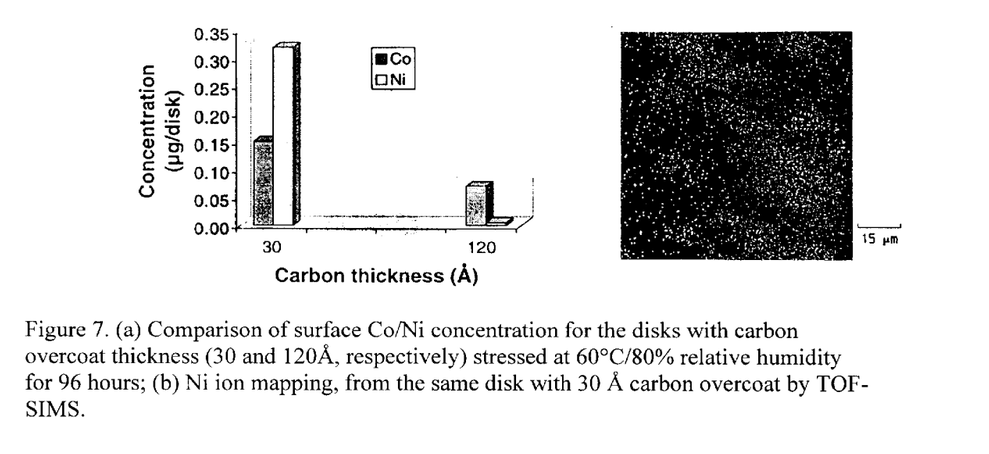

The characteristics for the sub-100 Å carbon overcoat also lead to the changes in the media corrosion behaviors. Two groups of disk samples with the carbon overcoat thickness of 30 and 120 Å, respectively, were selected for the disk media corrosion. The carbon overcoat was hydrogenated carbon with a hydrogen concentration of 24 at. % and was prepared by the DC-magnetron sputtering. The test was performed at 80° C. and 80% relative humidity for 96 hours. FIG. 7(a) shows the Co and Ni concentration measured by TOF-SIMS from these two groups of the samples. It can be observed from the figure that the Co concentration decreased with the increase of the carbon thickness. With a thinner carbon thickness, Ni surface concentration increased.

The mapping for Ni on carbon overcoat surface of the sample with 30 Å carbon overcoat after the stress test is shown in FIG. 7(b). Unlike the previous typical corrosion behaviors for Co where the distribution of the corrosion products were mostly along the disk texture line, the Ni on the surface are in the clustering form. The media surface was described as a cathode and the positive ions migrated to the surface through the defects in carbon overcoat. When the carbon is very thin, the surface lubricant layer would become integrated into the carbon layer, which could then be the reason that more Ni instead of Co migrated onto the surface. The reason for the characteristics of the Ni distribution is still not known at present. However, it is believed that the reason for the characteristics of Ni distribution is due to the Ni crystal formation. Therefore, it is more detrimental to the head performance.

FIGS. 4–7 convey clearly to those skilled in the art that the applicants invented the complete ranges disclosed in these figures. Applicants might seek to protect by their claims any part of the invention described in the specification.

In summary, sputter-deposited metal oxide films, particularly CrOx films, have good adhesion to a substrate having a Ni-containing pre-coat, and significantly reduce Ni migration from the substrate. The metal oxide film is a sealing layer or a sealing means and is capable of limiting Ni ions migrating onto the top surface of the recording medium to an intensity of $10^{12}$ atoms/cm$^2$ or less during the lifetime of the recording medium when the thickness of the layers above the substrate starting from the sealing layer is 1000 Å or less.

What is claimed is:

1. A longitudinal or perpendicular magnetic recording medium comprising, in this order:
    a Ni—P coated Al or Al-alloy substrate;
    a sealing layer comprising a substantially amorphous oxide of Cr wherein said sealing layer is directly deposited on the substrate and has a thickness of about 25 Å to about 500 Å; and
    a magnetic layer,
    wherein the sealing layer substantially prevents migration of Ni from the substrate to the magnetic layer of the magnetic recording medium.

2. The magnetic recording medium according to claim 1, wherein the surface of the sealing layer is oxidized.

3. The magnetic recording medium according to claim 1, wherein the sealing layer further comprises a material selected from the group consisting of Ti, Mo, W, Ta, Zr, Nb, B, P, an oxide of Ti, an oxide of Mo, an oxide of W, an oxide of Ta, an oxide of Zr and an oxide of Nb.

4. The magnetic recording medium according to claim 1, further comprising:
    an underlayer between the sealing layer and the magnetic layer; and
    a protective overcoat on the magnetic layer,
    wherein the substrate comprises an aluminum-containing support and a Ni-containing pre-coat.

5. The magnetic recording medium according to claim 4, wherein the underlayer comprises Cr or Cr-alloy.

6. A method of manufacturing a longitudinal or perpendicular magnetic recording medium, the method comprising:

sputter depositing a sealing layer comprising a substantially amorphous oxide of Cr wherein said sealing layer is directly deposited on the substrate and has a thickness of about 25 Å to about 500 Å on a Ni—P coated Al or Al-alloy substrate; and sputter depositing a magnetic layer on the sealing layer;

wherein the sealing layer substantially prevents migration of Ni from the substrate to the magnetic layer of the magnetic recording medium.

7. The method according to claim 6, further comprising oxidizing the surface of the sealing layer.

8. The method according to claim 6, wherein the sealing layer further comprises a material selected from the group consisting of Ti, Mo, W, Ta, Zr, Nb, B, P, an oxide of Ti, an oxide of Mo, an oxide of W, an oxide of Ta, an oxide of Zr and an oxide of Nb.

9. The method according to claim 6, wherein the magnetic layer comprises an alloy of Co, Cr, Pt and Ta.

10. The method according to claim 6, further comprising:

sputter depositing an underlayer on the sealing layer prior to said sputter depositing the magnetic layer; and sputter depositing a protective overcoat on the magnetic layer, wherein the substrate comprises an aluminum-containing support and a Ni-containing pre-coat.

11. The method according to claim 10, wherein the underlayer comprises Cr or Cr-alloy.

* * * * *